(12) United States Patent
Lu

(10) Patent No.: US 6,581,487 B1
(45) Date of Patent: Jun. 24, 2003

(54) THREE-GEAR POSITION TYPE TRANSMISSION MECHANISM FOR A REMOTE-CONTROL TOY CAR

(76) Inventor: Ke-Way Lu, 3F, No. 322, Sec. 6, Min-Chuan E. Rd., Taipei City (TW)

( * ) Notice: Subject to any disclaimer, the term of this patent is extended or adjusted under 35 U.S.C. 154(b) by 0 days.

(21) Appl. No.: 10/071,059

(22) Filed: Feb. 7, 2002

(51) Int. Cl.[7] ................................................. F16H 3/10
(52) U.S. Cl. ....................................... 74/333; 74/336 R
(58) Field of Search ............................... 74/333, 336 R

(56) References Cited

U.S. PATENT DOCUMENTS

| | | | | |
|---|---|---|---|---|
| 4,323,354 A | * | 4/1982 | Blanchard | 74/336 R |
| 4,457,185 A | * | 7/1984 | Yoshida et al. | 74/336 R |
| 5,099,712 A | * | 3/1992 | Douglass | 74/336 R |
| 6,093,128 A | * | 7/2000 | Seith | 475/258 |
| 6,413,143 B1 | * | 7/2002 | Lu | 74/336 R |

* cited by examiner

Primary Examiner—Sherry Estremsky
(74) Attorney, Agent, or Firm—Ladas & Parry

(57) ABSTRACT

A three-gear position type transmission mechanism for a remote control toy car is constructed to include a driven gear wheel, a transmission shaft, three transmission gear wheels mounted on the transmission shaft, and three idle gears mounted on a center shaft and respectively meshed with the transmission gear wheels. The third transmission gear wheel is rotated with the idle gear set and the transmission shaft when said driven gear wheel rotated at a low speed. The second transmission gear is rotated with the third transmission gear and transmission shaft and the second idle gear by means of the action of a centrifugal force-activated clutch when the driven gear wheel accelerated to a medium speed. The first, second and third transmission gears are rotated with the first, second and third idle gear and the transmission shaft by means of the action of a centrifugal force-activated clutch when the driven gear wheel accelerated to a high speed.

1 Claim, 5 Drawing Sheets

THREE-GEAR POSITION TYPE TRANSMISSION MECHANISM FOR A REMOTE-CONTROL TOY CAR

BACKGROUND OF THE INVENTION

1. Field of the Invention

The present invention relates to a remote control toy car and, more particularly, to a three-gear position type transmission mechanism for a remote control toy car.

2. Description of the Related Art

Regular gasoline engine remote control toy cars commonly use a transmission mechanism to increase the torque. However, because the transmission mechanism of a conventional gasoline engine remote control toy car provides only one transmission mode, it is less efficient to accelerate the speed, and the torsion cannot be increased during low speed. In order to eliminate these problems, dual-gear position transmission mechanisms are developed. However, a dual-gear position transmission mechanism is still not sufficient to move a toy car upwards on a slope at a high speed.

SUMMARY OF THE INVENTION

The present invention has been accomplished to provide a three-gear position type transmission mechanism for a remote control toy car, which eliminates the aforesaid drawbacks. It is one object of the present invention to provide a three-gear position type transmission mechanism for a remote control toy car, which uses a three-gear position transmission gear set to match with an idle gear set, enabling the toy car to automatically shift the gear position under a high revolving speed when moving upwards on a slope. To achieve this an other objects of the present invention, the three-gear position type transmission mechanism comprises a tubular transmission shaft, said tubular transmission shaft having a polygonal segment in a circularly tubular shaft body thereof; a transmission gear set mounted on the tubular transmission shaft, the transmission gear set comprising a first transmission gear wheel mounted on a two-way axle bearing at the tubular transmission shaft for two-way rotary motion, the first transmission gear wheel comprising an external gear and an internal gear, a second transmission gear wheel mounted on a two-way axle bearing at the tubular transmission shaft for two-way rotary motion, the second transmission gear wheel comprising an external gear, an internal gear, and a clutch adapted for engaging the internal gear of the first transmission gear wheel for enabling the first transmission gear wheel to be rotated with the second transmission gear wheel, a third transmission gear wheel mounted on the tubular transmission shaft for one-way rotary motion with the tubular transmission shaft, the third transmission gear wheel comprising a polygonal center hole coupled to the polygonal segment of the tubular transmission shaft, an external gear, and a clutch adapted for engaging the internal gear of the second transmission gear wheel for enabling the second transmission gear wheel to be rotated with the third transmission gear wheel; a driven gear wheel fixedly fastened to the first transmission gear wheel; and an idle gear set, the gear set comprising a center shaft supported on two-way axle bearings, a first idle gear fixedly mounted on the center shaft meshed with the external gear of the first transmission gear wheel, a second idle gear mounted on a one-way axle bearing at the center shaft and meshed with the external gear of the second transmission gear wheel, and a third idle gear mounted on a one-way axle bearing at the center shaft and meshed with the external gear of the third transmission gear wheel. When the driven gear wheel rotated by an external drive unit to rotate the first transmission gear wheel, the third idle gear is driven to rotate the third transmission gear wheel and the tubular transmission shaft at a low speed. The clutch of the third transmission gear wheel is forced outwards by a centrifugal force into engagement with the internal gear of the second transmission gear wheel when the revolving speed of the third transmission gear wheel surpassed a predetermined level, thereby causing the second transmission gear wheel and the second idle gear to be synchronously rotated with the tubular transmission shaft and the third transmission gear wheel at a middle speed. The clutch of the second transmission gear wheel is forced outwards by a centrifugal force into engagement with the internal gear of the first transmission gear wheel when the revolving speed of the second transmission gear wheel surpassed a predetermined level, thereby causing the first transmission gear wheel, the second transmission gear wheel, the third transmission gear wheel, the first idle gear, the second idle gear, the third idle gear, and the tubular transmission shaft to be rotated at a high speed.

DETAILED DESCRIPTION OF THE PREFERRED EMBODIMENT

Figure 1:
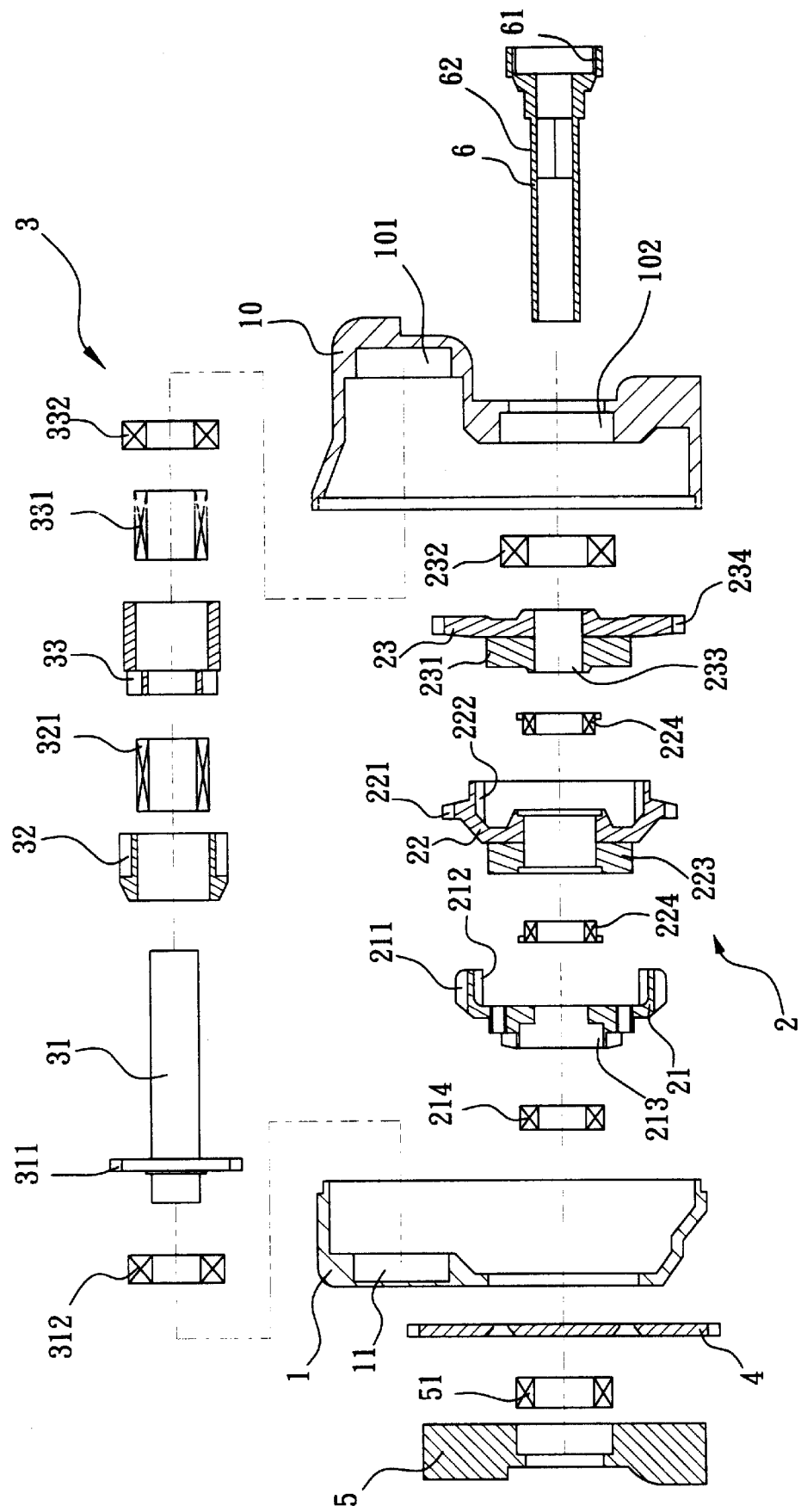
FIG. 1 is an exploded view in section of a three-gear position type transmission mechanism for a remote control toy car according to the present invention.
Figure 2:
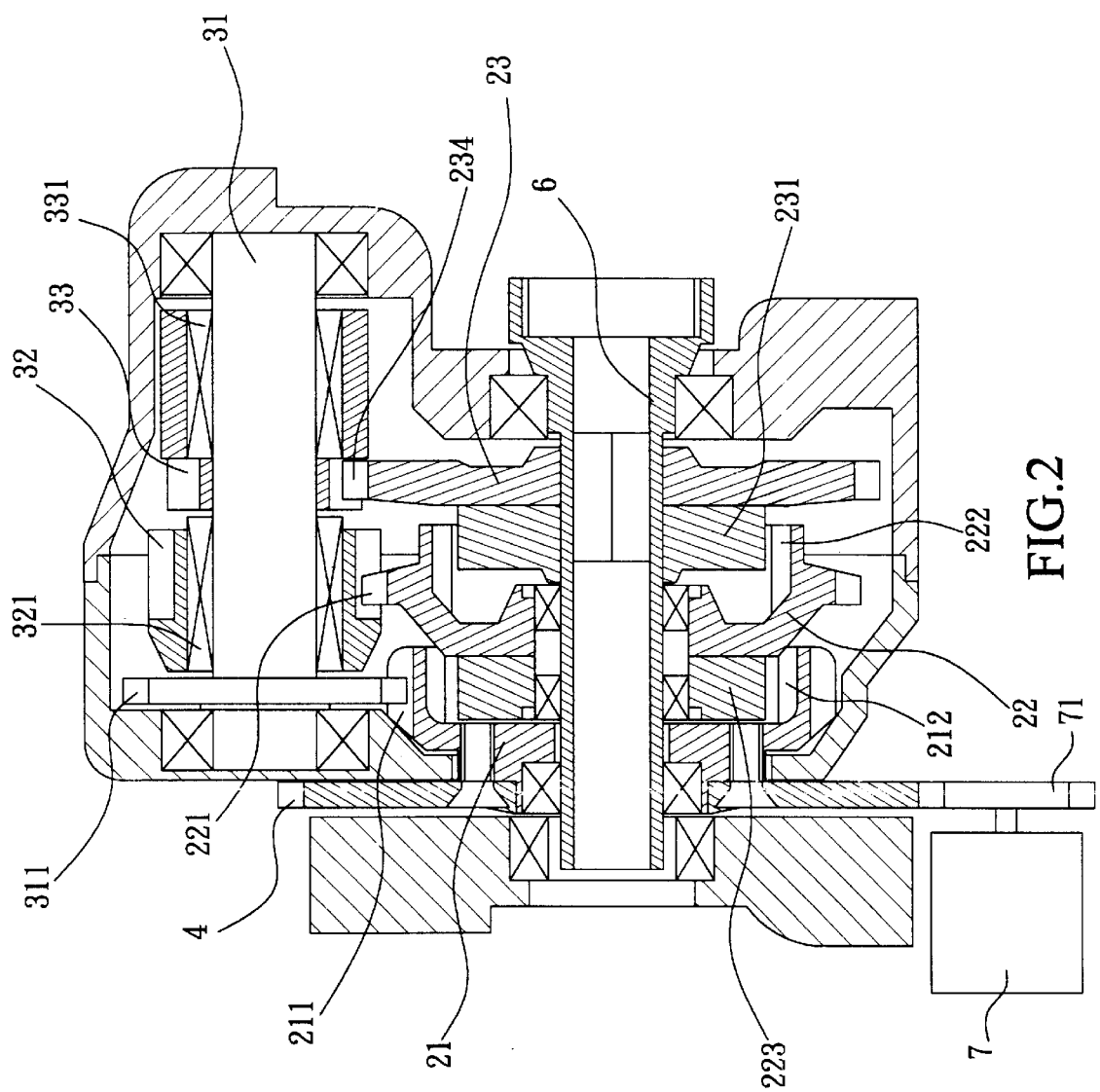
FIG. 2 is a sectional assembly view of the three-gear position type transmission mechanism for a remote control toy car according to the present invention.

Referring to FIGS. 1 and 2, a three-gear position type transmission mechanism for a remote control toy car in accordance with the present invention is generally comprised of a casing formed of a first shell 1 and a second shell 10, a transmission gear set 2, an idle gear set 3, a driven gear wheel 4, and a transmission shaft 6.

The first shell 1 and the second shell 10 are fastened together to hold the transmission gear set 2 and the idle gear set 3 on the inside. The first shell 1 has a bearing hole 11. The second shell 10 has a first bearing hole 101 aimed at the bearing hole 11 of the first shell 1, and a second bearing hole 102 spaced below the first bearing hole 101. Two-way axle bearings 312, 332, and 232 are respectively mounted in the bearing holes 11, 101, and 102 of the shells 1 and 10.

The transmission shaft 6 is a tubular shaft adapted for outputting the driving power of the three-gear position type transmission mechanism, having a polygonal segment 62 in the circularly tubular shaft body thereof.

The transmission gear set 2 comprises a first transmission gear wheel 21, a second transmission gear wheel 22, and a third transmission gear wheel 23. The first transmission gear wheel 21 comprises a center hole 213 coupled to a two-way axle bearing 214 supported on the transmission shaft 6, an external gear 211, and an internal gear 212. The second transmission gear wheel 22 is mounted on two two-way axle bearings 224 supported on the transmission shaft 6, comprising a clutch 223, an external gear 221, and an internal gear 222. The third transmission gear wheel 23 comprises a polygonal center hole 233 coupled to the polygonal segment 62 of the transmission shaft 6, a clutch 231, and an external gear 234. The transmission shaft 6 is inserted through the two-way axle bearing 232 in the second bearing hole 102 of the second shell 10, the third transmission gear wheel 23, the two-way axle bearings 224 in the second transmission gear wheel 22, the two-way axle bearing 214 in the first transmission gear wheel 21, and a two-way axle bearing 51 in a locating block 5 outside the first shell 1, keeping the polygonal segment 62 engaged into the polygonal center hole 233 of the third transmission gear wheel 23 and the clutch 223 of the second transmission gear wheel 22 and the clutch 231 of the third transmission gear wheel 23 respectively suspended within the internal gear 212 of the first transmission gear wheel 21 and the internal gear 222 of the second transmission gear wheel 22. The first transmission gear wheel 21, the second transmission gear wheel 22, and the third transmission gear wheel 23 are provided within the first shell 1 and the second shell 10. The first transmission gear wheel 21 has a part protruded out of the first shell 1 and fixedly fastened to the driven gear wheel 4 outside the first shell 1 by screws.

Figure 3:
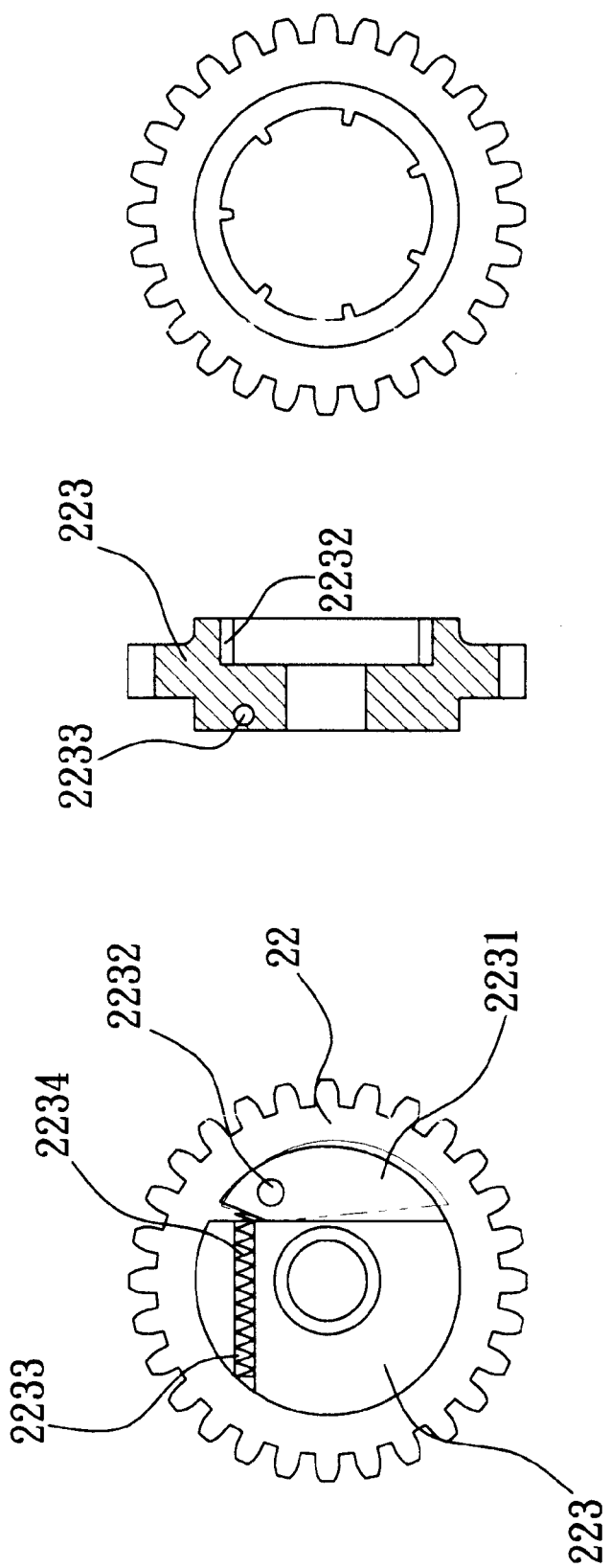
FIG. 3 is front, side and rear views, showing the arrangement of the clutch at the second transmission gear wheel according to the present invention.

Referring to FIG. 3 and FIG. 2 again, the clutch 223 of the second transmission gear wheel 22 comprises a swivel member 2231 pivoted to one side of the second transmission gear wheel 22 by a pivot 2232, and a spring member 2234 mounted in a hole in the second transmission gear wheel 22 and stopped against one end of the swivel member 2231, supporting the swivel member 2231 in the received position. Similar to the clutch 223 of the second transmission gear wheel 22, the clutch 231 of the third transmission gear wheel 23 is comprised of a swivel member 2331 and a spring member 2334 (not shown).

Referring to FIGS. 1 and 2 again, the idle gear set 3 comprises a center shaft 31 supported in the two-way axle bearing 312 at the first shell 1 and the two-way axle bearing 332 at the second shell 10, a first idle gear 311 fixedly mounted on the center shaft 31 and meshed with the external gear 211 of the first transmission gear wheel 21, a second idle gear 32 supported on a one-way axle bearing 321 at the center shaft 31 and meshed with the external gear 221 of the second transmission gear wheel 22, and a third idle gear 33 supported on a one-way axle bearing 331 at the center shaft 31 and meshed with the third transmission gear wheel 23.

Referring to FIG. 2 again, the driven gear wheel 4 is meshed with the pinion 71 at the engine 7. At the initial stage when the engine 7 started, the pinion 4 drives the driven gear wheel 4 and the first transmission gear wheel 21 to rotate synchronously. Because the external gear 211 of the first transmission gear wheel. 21 is meshed with the first idle gear 311 and the second idle gear 32 and third idle gear 33 are respectively mounted on the respective one-way axle bearings 321 and 331, the rotation of the first transmission gear wheel 21 causes the first idle gear 311, the second idle gear 32 and the third idle gear 33 to rotate synchronously. At this time, the second transmission gear wheel 22 runs idle, the third idle gear 33 drives the third transmission gear wheel 23 to rotate, and therefore the transmission shaft 6 is rotated with the third transmission gear wheel 23 to output the driving force.

When the engine 7 accelerated to such an extent that the revolving speed of the third transmission gear wheel 23 surpassed a predetermined value, the swivel member 2231 of the clutch 231 of the third transmission gear wheel 23 is forced outwards by centrifugal force against the spring power of the spring member 2234 into engagement with the internal gear 222 of the second transmission gear wheel 22, thereby causing the third transmission gear wheel 23 to rotate the second transmission gear wheel 22 and the second idle gear 32 to further accelerate the revolving speed of the transmission shaft 6. When the revolving speed of the second transmission gear wheel 22 surpassed a predetermined value, the swivel member 2331 is forced outwards by centrifugal force against the spring power of the spring member 2334 into engagement with the internal gear 212 of the first transmission gear 21, thereby causing the first transmission gear 21 to be rotated with the first idle gear 311, the second transmission gear wheel 22, and the first transmission gear wheel 21, to accelerate the revolving speed of the transmission shaft 6 further.

Figure 4:
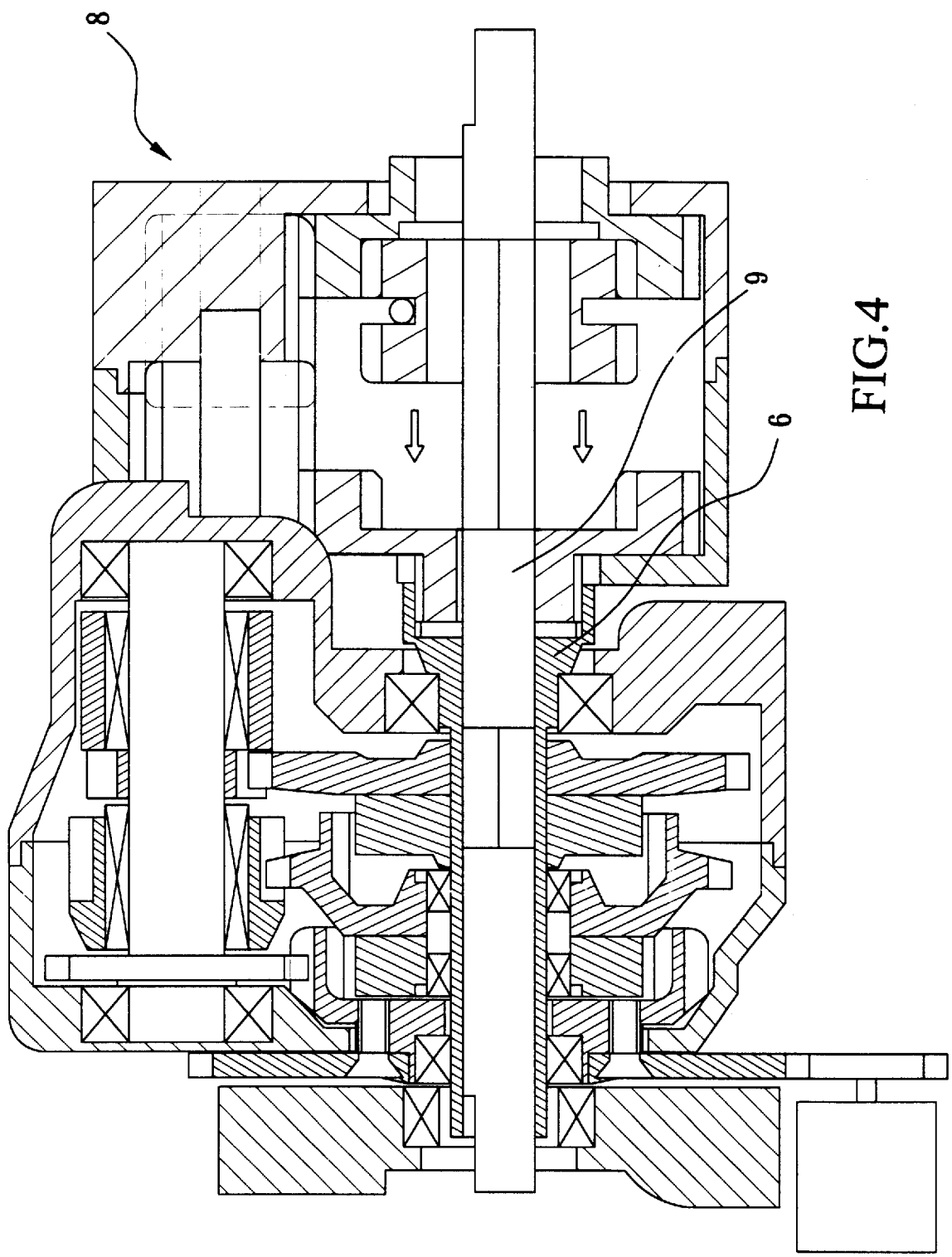
FIG. 4 is a sectional plain view showing one application example of the present invention.

Referring to FIG. 4, the transmission shaft 6 may be coupled to a reduction gear 8 and sleeved onto an output shaft 9 with the internal thread 61 thereof threaded onto an external thread (not shown) of the output shaft 9 for outputting the driving force through the output shaft 9.

Figure 5:
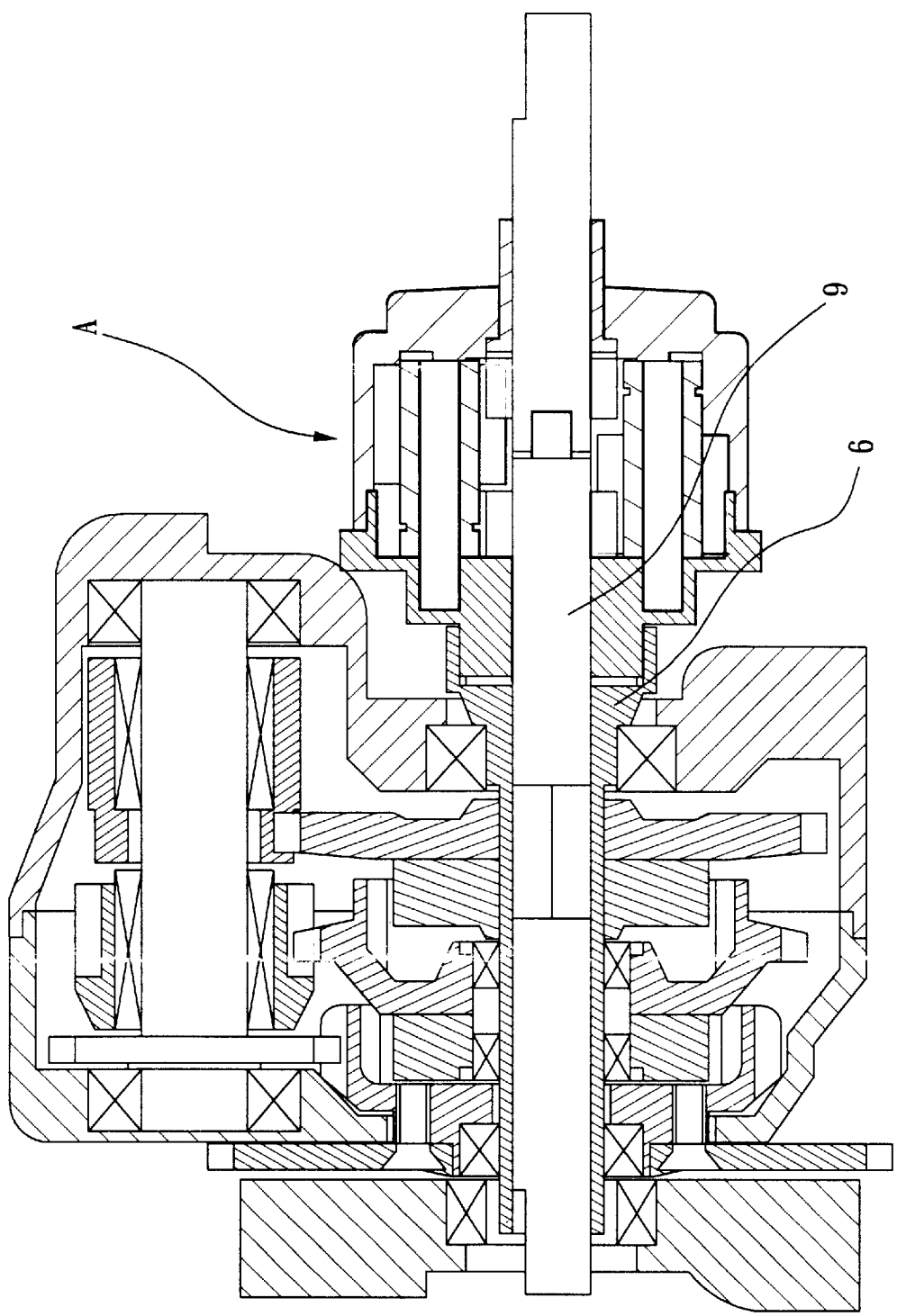
FIG. 5 is a sectional plain view showing another application example of the present invention.

Referring to FIG. 5, the transmission shaft 6 may be coupled to a speed differential mechanism A and sleeved onto an output shaft 9 with the internal thread 61 thereof threaded onto an external thread (not shown) of the output shaft 9 for outputting the driving force through the output shaft 9.

A prototype of three-gear position type transmission mechanism for a remote control toy car has been constructed with the features of FIGS. 1~5. The remote control toy car control system functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A three-gear position type transmission mechanism for a remote control toy car comprising:

a tubular transmission shaft, said tubular transmission shaft having a polygonal segment in a circularly tubular shaft body thereof;

a transmission gear set mounted on said tubular transmission shaft, said transmission gear set comprising a first transmission gear wheel mounted on a two-way axle bearing at said tubular transmission shaft for two-way rotary motion, said first transmission gear wheel comprising an external gear and an internal gear, a second transmission gear wheel mounted on a two-way axle bearing at said tubular transmission shaft for two-way rotary motion, said second transmission gear wheel comprising an external gear, an internal gear, and a clutch adapted for engaging the internal gear of said first transmission gear wheel for enabling said first transmission gear wheel to be rotated with said second transmission gear wheel, a third transmission gear wheel mounted on said tubular transmission shaft for one-way rotary motion with said tubular transmission shaft, said third transmission gear wheel comprising a polygonal center hole coupled to the polygonal segment of said tubular transmission shaft, an external gear, and a clutch adapted for engaging the internal gear of said second transmission gear wheel for enabling said second transmission gear wheel to be rotated with said third transmission gear wheel;

a driven gear wheel fixedly fastened to said first transmission gear wheel; and an idle gear set, said gear set comprising a center shaft supported on two-way axle bearings, a first idle gear fixedly mounted on said center shaft meshed with the external gear of said first transmission gear wheel, a second idle gear mounted on a one-way axle bearing at said center shaft and meshed with the external gear of said second transmission gear wheel, and a third idle gear mounted on a one-way axle bearing at said center shaft and meshed with the external gear of said third transmission gear wheel;

wherein when said driven gear wheel rotated by an external drive unit to rotate said first transmission gear wheel, said third idle gear is driven to rotate said third transmission gear wheel and said tubular transmission shaft at a low speed; the clutch of said third transmission gear wheel is forced outwards by a centrifugal force into engagement with the internal gear of said second transmission gear wheel when the revolving speed of said third transmission gear wheel surpassed a predetermined level, thereby causing said second transmission gear wheel and said second idle gear to be synchronously rotated with said tubular transmission shaft and said third transmission gear wheel at a middle speed; the clutch of said second transmission gear wheel is forced outwards by a centrifugal force into engagement with the internal gear of said first transmission gear wheel when the revolving speed of said second transmission gear wheel surpassed a predetermined level, thereby causing said first transmission gear wheel, said second transmission gear wheel, said third transmission gear wheel, said first idle gear, said second idle gear, said third idle gear, and said tubular transmission shaft to be rotated at a high speed.

* * * * *